Feb. 17, 1970

E. LANGBERG 3,496,372

METHOD OF USING AND MAKING A REDUCED-SCALE MARKER FROM
A PLURALITY OF REDUCED-SCALE PATTERNS WHICH HAVE
BEEN FORMED TO HAVE AN OPTICALLY DISTINGUISHABLE
EDGE SUCH AS A CHAMFER

Filed June 22, 1967

INVENTOR
EDWIN LANGBERG
BY Robert E. Corb
ATTORNEY

Feb. 17, 1970           E. LANGBERG           3,496,372
METHOD OF USING AND MAKING A REDUCED-SCALE MARKER FROM
A PLURALITY OF REDUCED-SCALE PATTERNS WHICH HAVE
BEEN FORMED TO HAVE AN OPTICALLY DISTINGUISHABLE
EDGE SUCH AS A CHAMFER

Filed June 22, 1967           3 Sheets-Sheet 2

INVENTOR
EDWIN LANGBERG
BY Robert E. Cole
ATTORNEY

United States Patent Office 3,496,372
Patented Feb. 17, 1970

3,496,372
METHOD OF USING AND MAKING A REDUCED-SCALE MARKER FROM A PLURALITY OF REDUCED-SCALE PATTERNS WHICH HAVE BEEN FORMED TO HAVE AN OPTICALLY DISTINGUISHABLE EDGE SUCH AS A CHAMFER
Edwin Langberg, Lexington, Mass., assignor, by mesne assignments, to New England Merchants National Bank of Boston
Filed June 22, 1967, Ser. No. 648,154
Int. Cl. A41h 3/00
U.S. Cl. 250—219                                   18 Claims

ABSTRACT OF THE DISCLOSURE

A method of making and using a reduced-scale marker for producing a record capable of controlling the reproduction of a full-scale marker comprising the steps of (i) separating from stock the reduced scale patterns, (ii) forming marginal areas along the edges of the patterns which have an optically distinguishable property (preferably a chamber) (iii) arranging said patterns to form a reduced scale marker and (iv) optically scanning said marker to generate a corresponding electrical signal.

CROSS-REFERENCE TO RELATED APPLICATION

This application relates to a copending application of Edwin Langberg et al., Ser. No. 598,534, filed Sept. 26, 1966.

BACKGROUND OF THE INVENTION

In a number of industries, such as the garment industry, involving the assembly of sheet materials such as fabrics into a completed product such as a garment, a basic step is the cutting of the sheet material according to patterns. In the garment industry, the fabric to be cut is first marked with an outline of the patterns arranged to achieve the most efficient utilization of the fabric and this arrangement of cutting patterns on a fabric has come to be known as a "marker." In the past, it has been the practice to arrange patterns on the fabric or other sheet material and manually trace the outlines of the pattern. Full-scale patterns are difficult to lay out and cumbersome to work with, and manually tracing patterns to form markers is not only slow and costly, but is subject to inaccuracies frequently resulting in waste of fabrics. Miniature markers made up of miniature patterns are frequently employed as an aid in achieving the most efficient layout because of the convenience in handling of the miniature patterns.

A fabric marker production system capable of rapidly and automatically producing full-scale markers from reduced-scale markers has been devised and is the invention of Edwin Langberg et al., described and claimed in the above-identified copending application. The system includes electro-optical scanning means effective to detect and make a record in accordance with the edge configurations of reduced-scale patterns in a miniature marker in terms of contrasting reflectivity between the scanned patterns surface and the surface of a lay-out table on which the patterns are arranged and which has a width corresponding, at the same reduced scale, to the width of the material to be cut.

In order to minimize eventual fabric waste, the reduced-scale (miniature) patterns of the reduced-scale (miniature) marker are arranged so as to cover a maximum area of the miniature marker. To this end, it is desirable to place mating edge configurations of discrete miniature patterns in abutment on the surface of the lay-out table. The effect of this, however, is to occlude the (contrasting) background of the lay-out table along the line of mating abutment of the patterns, with the result that the common boundary lines between the discrete miniature patterns are undetectable by optical scanning apparatus. Further, slits in the interior of the full-scale master patterns commonly used to indicate eventual locations of buttons, button holes, etc. are not optically detectable when transferred to reduced-scale patterns by conventional miniature pattern making techniques.

OBJECTS

Accordingly, it is an object of this invention to provide method and means for making reduced-scale patterns having edge configurations detectable by optical scanning means irrespective of the background against which the patterns are arranged.

It is another object to provide method and apparatus for making reduced-scale patterns wherein in the same operation in which the patterns are separated from sheet stock, marginal areas are formed along the configured edges having a property optically distinguishable from a corresponding property of a surface of the patterns.

Other objects of the invention will in part be obvious and will in part appear hereinafter.

The invention accordingly comprises the apparatus possessing the construction, combination of elements and arrangement of parts and the method involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a schematic view of electro-optical scanning apparatus scanning a reduced-scale marker comprising reduced-scale patterns made in accordance with this invention;

FIG. 2 schematically shows apparatus for separating from sheet stock reduced-scale patterns having the edge configurations of full-scale master patterns;

DESCRIPTION OF THE PREFERRED EMBODIMENTS

An understanding of methods and apparatus for making patterns in accordance with the invention will be enhanced by a knowledge of the use to which the patterns are put during the manufacture of a garment or other product comprising sheet material components.

Figure 1:
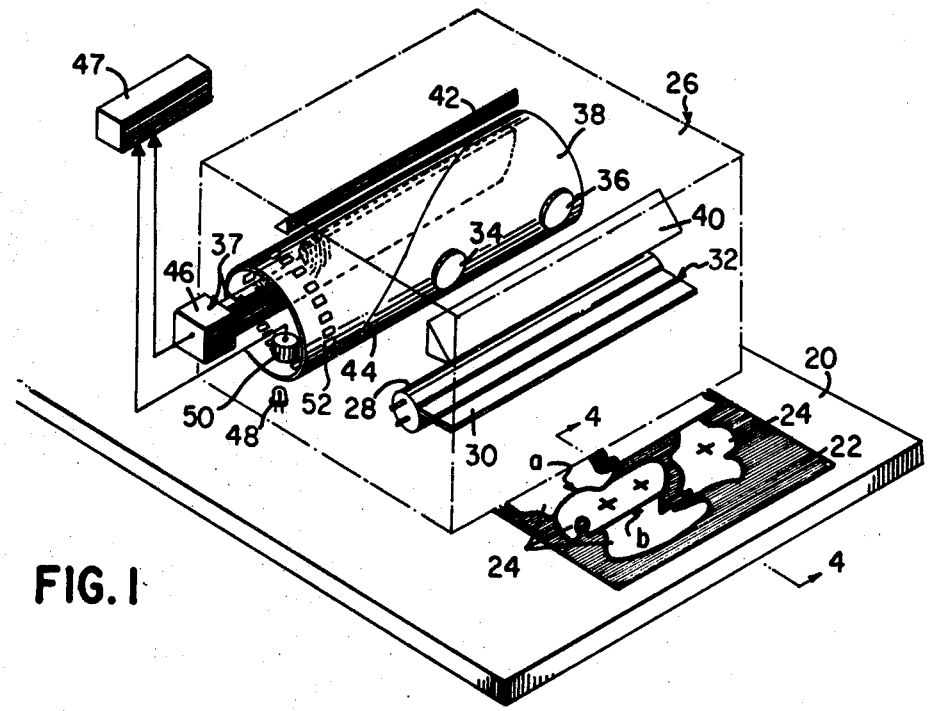

FIGURE 1 depicts a lay-out table 20 having a width corresponding, on a reduced scale, to the width of the desired full-scale marker, on which is disposed a reduced-scale marker 22 comprising a group of reduced-scale patterns 24 positioned against an optically contrasting surface of the lay-out table 20. The patterns are arranged so as to minimize the uncovered area of the marker 22, that is, the surface of the lay-out table, and thus to minimize the waste when sheet material components are subsequently cut in accordance with a full-scale marker made to correspond to the reduced-scale marker 22.

An optical scanner for optically scanning the reduced-scale marker 22 to produce a record from which a full-scale marker may be made comprises the invention of Edwin Langberg et al., disclosed and claimed in copending patent appplication Ser. No. 598,534, filed Sept. 26, 1966. A scanner substantially as described in the above-identified application is shown in schematic form in FIGURE 1 at 26. The scanner 26 effects a line-by-line spot scan of the marker 22 and comprises a light source in the form of a fluorescent lamp 28 positioned to radiate luminous energy downwardly to brightly illuminate the scanned surface, in this case the reduced-scale marker 22.

A mask 30 defines a narrow slit 32 acting as a field stop for an optical relay comprising a pair of lenses 34, 36 which form an image of a narrow illuminated area of marker 22 on an area coextensive with the ends of optical fibers, collectively designated 37, axially aligned with a scanning drum 38. Internally reflecting surfaces on a pair of prisms 40, 42 serve to fold the light path from the mask 30 to the scanning drum 38.

Means (not shown) are provided for transporting the scanner 26 over the lay-out table 20 in a direction parallel to and immediately above the reduced-scale marker 22 to effect a line-by-line scan of the marker 22.

In order that a spot scan of the scanning line may be achieved, the scanning drum 38 is provided. The drum 38 is preferably opaque with a transparent helical scanning line 44 thereon, formed, for example, by photographic techniques. As the scanning drum 38 is rotated (by means not shown), the scanner 26 effects a line-by-line spot scan of the patterns 24 comprising marker 22, the rate of which scan is controllable by varying the translational transport speed of the scanner 26 across the marker 22 and the speed of rotation of the scanning drum 38.

The information picked up optically by the scanner 26 is translated into electrical pattern signals by means 46 including a photomultiplier tube positioned to receive the optical output from the optical fibers 37. The electrical pattern signals generated by the scanner 26 represent the scanning of a miniature pattern area on the background surface of the lay-out table and may be utilized directly by a full-scale marker production device, or alternatively, may be stored, for example, upon magnetic tape for later use. A tape recorder 47 is shown for recording the print signals.

Means are provided for synchronizing the operation of scanner 26 with that of the marker production device eventually used to read out, e.g., as a printed full-scale marker, the recorded pattern signals. Accordingly, synchronization means are provided, comprising an optical chopper and a photoresponsive detector. The optical chopper may comprise, as shown, lamp 48 addressing a photocell 50 through scanning drum 38. The drum 38 is provided with a circumferentially arranged series of evenly spaced transparent areas 52 aligned to pass between the lamp 48 and the photocell 50 when the drum 38 is rotated. In operation, electrical synchronization signals are generated by means including the photocell 50 which are indicative of the rate of scan of the scanner 26. The synchronization signals are preferably recorded by the recorder 47 on one channel of two-channel tape, the pattern signals being recorded on the other channel.

As suggested, in the interests of fabric waste minimization the patterns 24 of the reduced-scale marker 22 are arranged on the surface of the lay-out table 20 so as to cover a maximum area thereof. To this end, one obvious expedient is to dispose matable edge configurations of discrete patterns 24 in abutting relationship, as shown at $a$ and $b$ in FIGURE 1. However, in so disposing mating edge configurations in abutment, the optically contrasting background for the patterns is lost along the common boundary line between the edge-mated patterns.

In accordance with one aspect of this invention, method and means are provided for making reduced-scale markers having edge configurations capable of being optically distinguished relative to the pattern surface by optical scanning devices such as the illustrated scanner 26.

Figure 2:
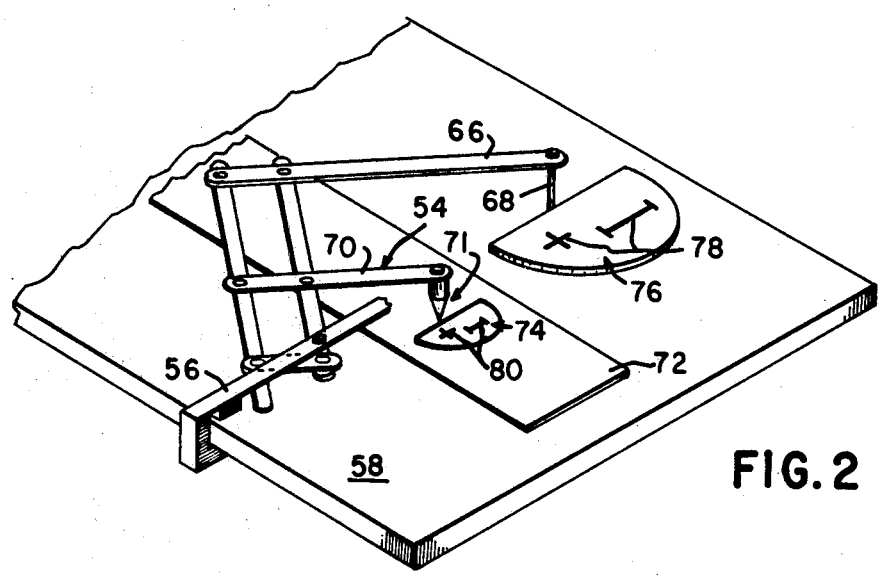

The novel means for making reduced-scale patterns with optically detectable edge configurations may expediently be combined with a pantograph for producing reduced-scale patterns with the same edge configurations as full-scale master patterns, but reduced in scale by a predetermined factor. FIG. 2 depicts a double-parallelogram pantograph 54 known to the prior art which may be used for producing in reduced scale patterns having the edge configuration of full-scale master patterns. Referring to FIG. 2, a pantograph 54 is illustrated, being supported on a traveling support member 56 on a work table 58. The pantograph 54 comprises an articulated linkage having a plurality of constituent members, of which member 66 may carry a tracing needle 68 at the free end thereof, and of which member 70 may carry a cutting implement 71 at the free end thereof for separating reduced-scale patterns from sheet stock 72.

As is well known, to produce reduced-scale patterns (for example as shown at 74 in FIG. 2) having the edge configurations of full-scale master patterns (for example as shown at 76 in FIG. 2), the operator follows the edge configurations of the master pattern 76 with the tracing needle 68 on member 66, and the cutting implement 71 will follow the same configurations but reduced by a scale factor determined by the geometry of the pantograph 54. The term "edge configurations" is herein intended to encompass not only the boundary configurations of the patterns, but also any predetermined indicia interior of the boundaries (such as indicated at 78 on master pattern 76 and at 80 on reduced-scale pattern 78) which might be useful in indicating the intended location of buttons, button-holes, etc. on the final sheet material components of the end product.

This invention contemplates forming, in any of a variety of methods, marginal areas along the edge configurations of reduced-scale patterns which have a property optically distinguishable from a corresponding property of a surface of the said patterns, irrespective of the background against which said patterns may be arranged.

In one implementation of the invention, the described marginal areas may be formed along the pattern edge configurations by employing sheet stock having a surface layer, coating or lamination having a different optical property than a substrate beneath the surface material and removing the said surface layer, coating or lamination in a narrow strip along the edge configurations to expose the substrate.

Figure 3:
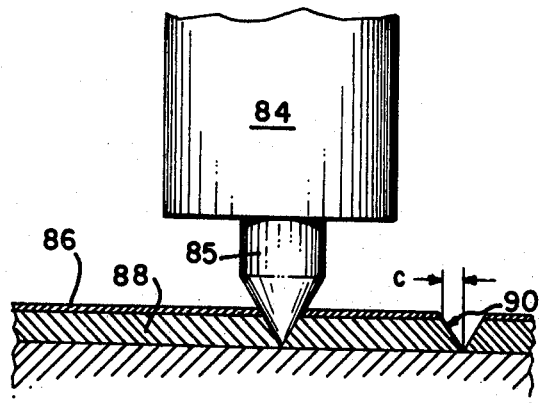
FIG. 3 is a side elevational view, partially in section, illustrating one implementation of the inventive concepts.

More specifically, a sheet stock may be employed which comprises a substrate such as a synthetic resin supporting a layer, coating lamination or deposit of aluminum, white pigment, or other highly reflective material. The substrate has a contrasting optical property, in this embodiment low reflectivity (high absorptivity) relative to the reflectivity of the surface layer material. As shown in FIG. 3, a cutting implement 84 having a sharply tapered, heated tip 85 may be used to separate the reduced-scale patterns from sheet stock and simultaneously therewith to remove surface layer 86 to expose a marginal portion of the substrate 68.

Figure 4:
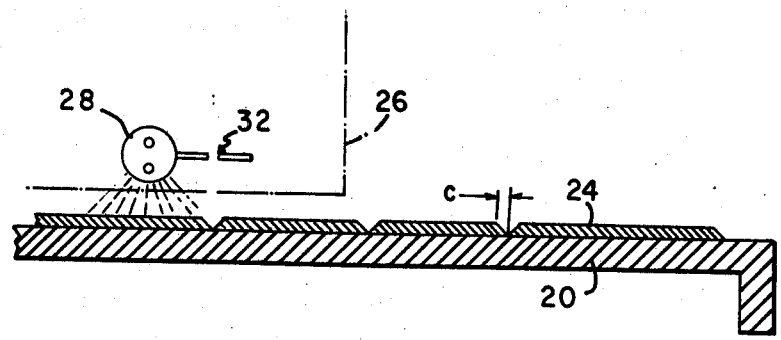
FIG. 4 is a sectional view taken on lines 4—4 in FIGURE 1.

With such a technique there are formed beveled edge surfaces 90 sloping outwardly from the front surface of the sheet stock. As can be noted from FIGS. 3 and 4, bringing mating beveled edge surfaces 90 of discrete patterns together offers an optically detectable width equal to twice the front surface projection $c$ of the beveled edge surface 90 of the exposed substrate. If, for example, the scanner 26 has a minimum resolution of .015 inch, the front surface projection $c$ of beveled edge surfaces 90 formed on the configured edges of the patterns must be .075 inch or greater. If, for example, the substrate has a thickness of .075 inch also, the taper on the tip 85 of the cutting implement 84 would be at least 45 degrees.

Rather than using a substrate which is darker (more highly light absorptive) than the surface layer, the surface layer may be less light reflective than the substrate to create a contrast therebetween.

Alternatively, substrate may be employed which has at least a surface layer of a material which will char or otherwise alter one of its optical properties during cutting thereof by a thermally excited instrumentality to define margin areas less highly reflective than the unaffected surface area of the separated pattern.

Figure 5:
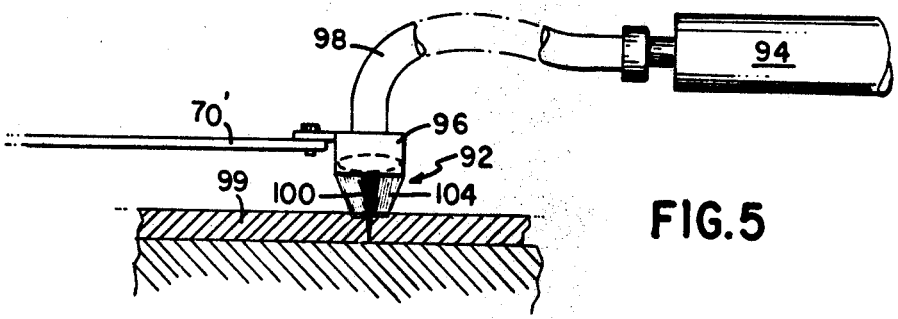
FIG. 5 is a view of an alternative implementation of the invention.

In another implementation of the invention, shown in FIG. 5, an intense beam of electromagnetic radiation, for example, a laser beam, as shown at 92, is employed. The laser beam 92 is shown as being generated by a laser 94 and piped to a head 96 mounted on a pantograph member 70' by a flexible optical fiber bundle 98. The beam 92 may be used to both sever a polymeric sheet stock material coated with or in which there is suspended a thermochromic material and alter its spectral properties in marginal areas along the severed edges thereof. The laser beam 92 preferably is caused to have a high intensity core 100 for severing the sheet stock 99 and a peripheral region 104 with an intensity less than that of core 100 but sufficient to thermally alter the spectral characteristics of a thermochromic material in marginal areas along the severed edges of a separated pattern. By "thermochromic" is meant many well-known materials which undergo a chemical or physical change when heated, resulting in a change in color or light absorptivity.

Alternatively, a convergent laser beam may be employed to form a beveled edge on the patterns during the cutting operation. Materials employed for this purpose include polymers which do not support combustion, but which vaporize and/or oxidize under the intense heat of the laser beam leaving a clean, well-defined edge configuration.

Figure 6:
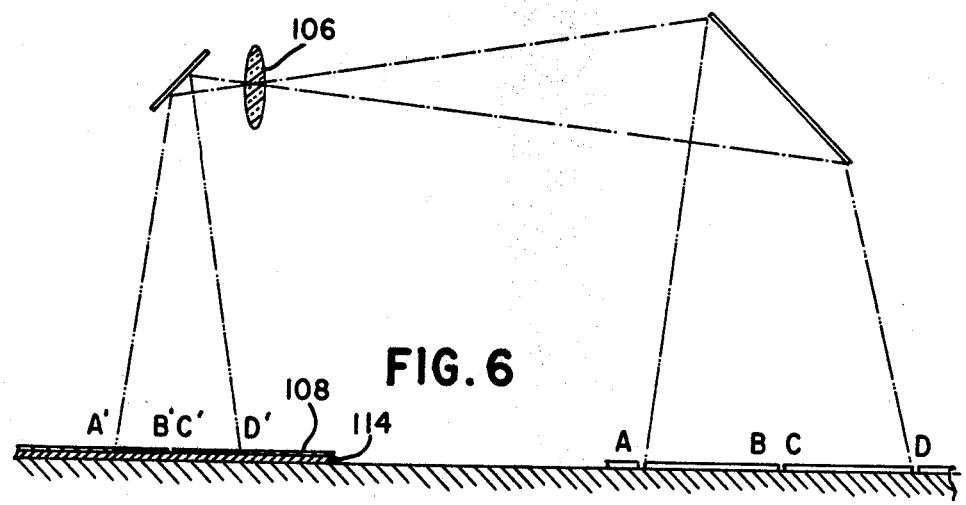
FIGS. 6 and 7 illustrate yet another method and means for carrying out the inventive principles.
Figure 7:
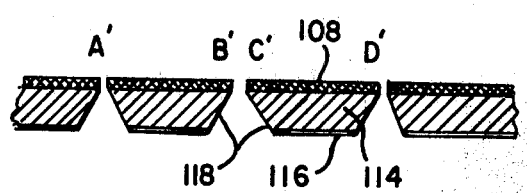

FIGS. 6 and 7 illustrate a way in which the concepts of the invention may be implemented by a photo-etching technique. Full-scale master patterns AB and CD are imaged at a predetermined reduced scale by a lens 106 upon a layer 108 of an etch-resistant photosensitive material coated on a supporting substrate 114 which can be etched. Layer 108 is resistant to the etchant and has the property of being rendered differentially developable by exposure to radiation actinic to the material. Suitable materials for this purpose are rendered insoluble by development and include, for example, dichromated gelatin. The layer 108 is supported on one surface of substrate 114, the opposite surface of which is coated with a layer 116 having the property of relatively low light reflectivity. In a preferred embodiment, the substrate 114 may comprise an aluminum sheet with a flat black anodic coating 116 on the surface opposite the photosensitive resist.

Referring especially to FIG. 7, the exposed laminate is processed in a conventional manner to retain the etch resistant layer 108 in the areas corresponding to the reduced-scale pattern images A'B' and C'D' and remove layer 108 of each resistant material in areas surrounding the pattern images. The patterns A'B' and C'D' are then separated from the substrate 114 by etching away the substrate 114 in the areas corresponding to the unexposed areas.

In accordance with the principles of this invention, marginal areas are formed along the configured edges of the patterns A'B' and C'D' which are optically detectable relative to the flat black surface coating 116 on the substrate 114. To this end, undercutting techniques are used during the etching operation to form beveled edge surfaces 118 along the configured edges which slope outwardly from the surface coating 116. The patterns are inverted for use in making a reduced-scale marker, the beveled edge surfaces 118 providing marginal areas which are optically detectable by scanning devices in terms of the (relatively high) reflectivity of the beveled edge surfaces relative to the (relatively low) reflectivity of the flat black surface of coating 116.

It should be understood from the above description and the stated objects of the invention that the inventive concepts may be implemented by any of a variety of methods and means which effect the formation of marginal areas along the configured edges of reduced scale patterns having an optical property, including reflectivity, absorptivity, and spectral characteristics, which is optically distinguishable from the corresponding property of the surface of the patterns.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. The method of making a reduced-scale marker for use with a scanning optical recorder for producing a record capable of controlling the reproduction of a full-scale marker, said method comprising the steps of:

separating from sheet stock reduced-scale patterns having the edge configurations of predetermined full-scale patterns;

forming marginal areas along said configured edges having a property optically distinguishable from a corresponding property of a surface of said patterns, whereby said edge configurations of said reduced-scale patterns are optically detectable relative to said pattern surface irrespective of the background against which said patterns may be arranged; and arranging said reduced-scale patterns on a surface to form a reduced-scale marker.

2. The method of claim 1 wherein said sheet stock comprises a substrate and a surface layer having a different optical property from said substrate and wherein said marginal areas are formed by removing said surface layer along said edge configurations to expose said substrate.

3. The method of claim 2 wherein said patterns are separated from said sheet stock so as to form beveled edge surfaces on said patterns sloping outwardly from said surface layer and effective to expose said substrate to define said marginal areas.

4. The method of claim 3 wherein said patterns are separated from said sheet stock by drawing a heated, sharply tapered implement through said sheet stock to form said beveled edge surfaces on said patterns.

5. The method of claim 4 wherein said sheet stock comprises a substrate of a synthetic resin and a surface layer having a surface characteristic of low light absorptivity relative to the light absorptivity of said substrate.

6. The method of claim 1 wherein said sheet stock has a first surface having relatively low reflectivity and wherein said reduced-scale patterns are separated from said sheet stock by photographically exposing a layer on the opposed second surface of said sheet stock of an etch-resistant material capable of being rendered differentially developable by exposure to actinic light, to images of said patterns, processing said layer to retain said etch-resistant layer in regions thereof corresponding to said images of said patterns to remove said material from the remaining areas thereof, and separating said patterns from said sheet stock by etching away said sheet stock in said remaining areas, and wherein said marginal areas are formed during said etching operation by undercutting the edges of said sheet stock underlying said pattern areas to produce relatively highly reflective beveled edge surfaces sloping outwardly from said first surface to said second surface of said patterns, whereby said beveled edge surfaces define marginal areas optically detectable in terms of the reflectivity of said marginal areas relative to the reflectivity of said first surface of said patterns.

7. The method of claim 1 wherein said sheet stock comprises at least a surface layer of a material having a thermally responsive optical property, and wherein said patterns are separated from said sheet stock by cutting with a thermally excited instrumentality, whereby the said optical property of said material is altered in marginal areas along said configured pattern edges to enable the optical detection of said configured edges relative to the surfaces of said patterns.

8. The method of claim 7 wherein said sheet stock is cut with a high energy beam of electromagnetic radiation.

9. The method of claim 7 wherein said sheet stock is cut with a beam of substantially coherent electromagnetic radiation, and wherein said material having said thermally responsive property is thermochromic.

10. In the manufacture of a product comprising a plurality of components cut from sheet materials according to full-scale patterns arranged to form a marker, the method comprising:
- separating from sheet stock reduced-scale patterns having the edge configurations of said full-scale patterns;
- forming marginal areas along said configured edges having a property optically distinguishable from a corresponding property of a surface of said patterns, whereby said edge configurations of said reduced-scale patterns are optically detectable relative to said pattern surface;
- arranging said reduced-scale patterns on a lay-out surface to form a reduced-scale marker in which said reduced-scale patterns cover a maximum area of the lay-out surface without overlapping;
- systematically optically scanning said reduced scale marker to detect the said optical property possessed by said marginal areas;
- generating electrical pattern signals in accordance with the arrangement and edge configurations of said reduced-scale patterns of said reduced-scale marker;
- generating electrical synchronization signals corresponding to the rate at which said reduced-scale marker is scanned; and
- recording said pattern signals and said synchronization signals to form a record for controlling the operation of means for producing a full-scale marker including full-scale patterns to be employed as a guide in cutting out said components of said product.

11. The method of claim 10 wherein said sheet stock comprises a substrate and a surface layer having a different optical property from said substrate and wherein said marginal areas are formed by altering said surface layer in said marginal areas to expose said substrate.

12. The method of claim 11 wherein said patterns are separated from said sheet stock so as to form beveled edge surfaces on said patterns which slope outwardly from said surface layer and which are effective to expose said substrate to define said marginal areas.

13. The method of claim 12 wherein said patterns are separated from said sheet stock moving a heated, tapered implement through said sheet stock to form said beveled edge surfaces on said patterns.

14. The method of claim 13 wherein said sheet stock comprises a substrate of a synthetic resin and a surface layer having a surface characteristic of low light absorptivity relative to the light absorptivity of said substrate.

15. The method of claim 10 wherein said sheet stock has a first surface having relatively low reflectivity and wherein said reduced-scale patterns are separated from said sheet stock by photographically exposing a layer on the opposed second surface of said sheet stock of an etch-resistant material capable of being rendered differentially developable by exposure to actinic light, to images of said patterns, processing said layer to retain said etch-resistant layer in regions thereof corresponding to said images of said patterns to remove said material from the remaining areas thereof, and separating said patterns from said sheet stock by etching away said sheet stock in said remaining areas, and wherein said marginal areas are formed during said etching operation by undercutting the edges of said sheet stock underlying said pattern areas to produce relatively highly reflective beveled edge surfaces sloping outwardly from said first surface to said second surface of said patterns, whereby said beveled edge surfaces define marginal areas optically detectable in terms of the reflectivity of said marginal areas relative to the reflectivity of said first surface of said patterns.

16. The method of claim 10 wherein said sheet stock comprises at least a surface layer of a material having a thermally responsive optical property, and wherein said patterns are separated from said sheet stock by moving a thermally excited instrumentality through said sheet stock and heat is transferred to said material of said surface layer to alter said optical property thereof in marginal areas along said configured pattern edges to enable the optical detection of said configured edges relative to the surface of said patterns.

17. The method of claim 16 wherein said sheet stock is cut with a high-energy beam of electromagnetic radiation.

18. The method of claim 16 wherein said sheet stock is cut with a beam of substantially coherent electromagnetic radiation, and wherein said material having said thermally responsive optical property is thermochromic.

References Cited

UNITED STATES PATENTS

| | | | |
|---|---|---|---|
| 2,065,734 | 12/1936 | Pierson | 33—121 X |
| 2,423,440 | 7/1947 | Neergaard | 250—202 X |
| 2,842,772 | 7/1958 | Littman | 33—13 X |
| 3,134,173 | 5/1964 | Williams | 33—13 X |
| 3,302,209 | 1/1967 | Fengler | 250—202 X |

RALPH G. NILSON, Primary Examiner

T. N. GRIGSBY, Assistant Examiner

U.S. Cl. X.R.

33—12, 13